United States Patent [19]

Cole, Jr.

[11] 4,097,130
[45] Jun. 27, 1978

[54] MULTI-COLORED LIQUID CRYSTAL DISPLAYS

[75] Inventor: Herbert S. Cole, Jr., Scotia, N.Y.

[73] Assignee: General Electric Company, Schenectady, N.Y.

[21] Appl. No.: 776,603

[22] Filed: Mar. 11, 1977

[51] Int. Cl.² .............................................. G02F 1/13
[52] U.S. Cl. ..................................... 350/335; 350/349
[58] Field of Search ........................... 350/160 LC, 150

[56] References Cited

U.S. PATENT DOCUMENTS

| 3,864,022 | 2/1975 | Moriyama et al. | 350/160 LC |
| 3,900,248 | 8/1975 | Nagasaki | 350/160 LC |
| 3,967,881 | 7/1976 | Moriyama et al. | 350/150 |
| 4,019,808 | 4/1977 | Scheffer | 350/160 LC |
| 4,025,164 | 5/1977 | Doriguzzi et al. | 350/160 LC |

Primary Examiner—Edward S. Bauer
Attorney, Agent, or Firm—Geoffrey H. Krauss; Joseph T. Cohen; Marvin Snyder

[57] ABSTRACT

A transmissive liquid crystal display actuatable to provide each of a plurality of different colors utilizes at least one parallel-nematic or twisted-nematic liquid crystal cell each having a dichroic dye dissolved therein for absorbing light each of a different color. The cells are sequentially arranged between a pair of polarizing elements have their axes of polarization perpendicular to one another. The polarizing element nearest an observer contains a dichroic dye for absorbing an additional wavelength (color) of visible light and may be selectively actuatable. By energizing different combinations of the cells from their quiescent to active conditions, different combinations of visible light wavelengths are absorbed to change the color of light transmitted through the display. Maximum-color displays, providing up to $2^N$ different colors (wherein N is the number of activatable liquid crystal elements) utilize one or two twisted-nematic liquid cells closest to the dichroic exit polarizer, with the remainder of the active liquid crystal cells being of the parallel nematic type.

16 Claims, 9 Drawing Figures

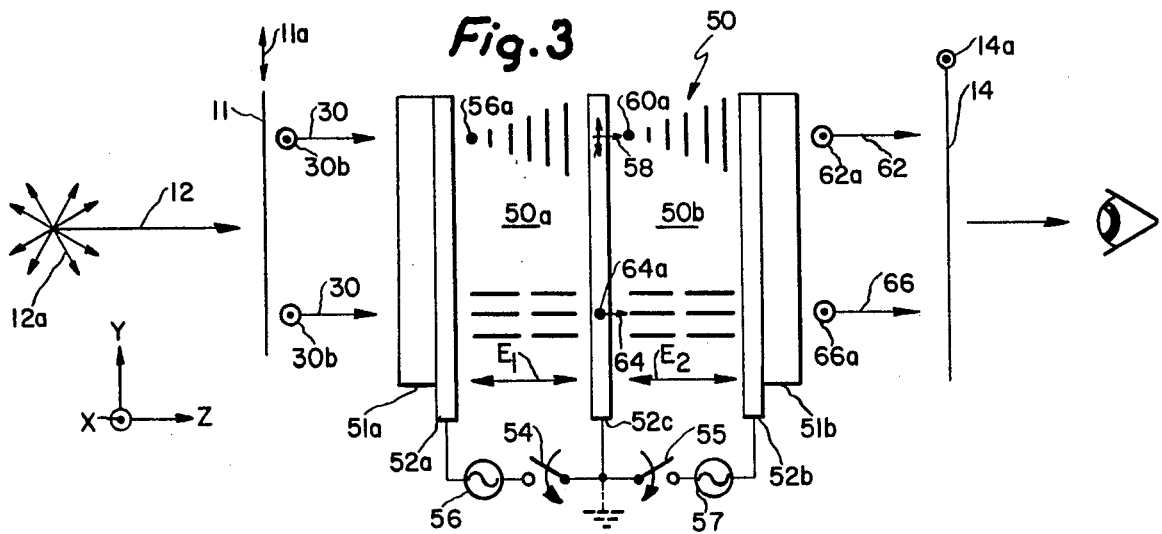
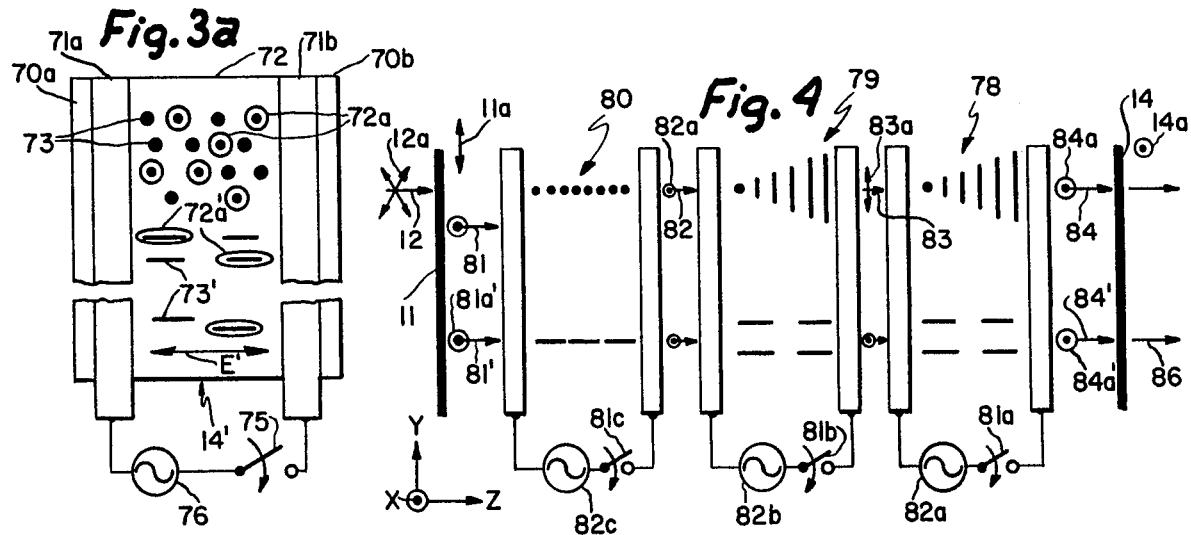
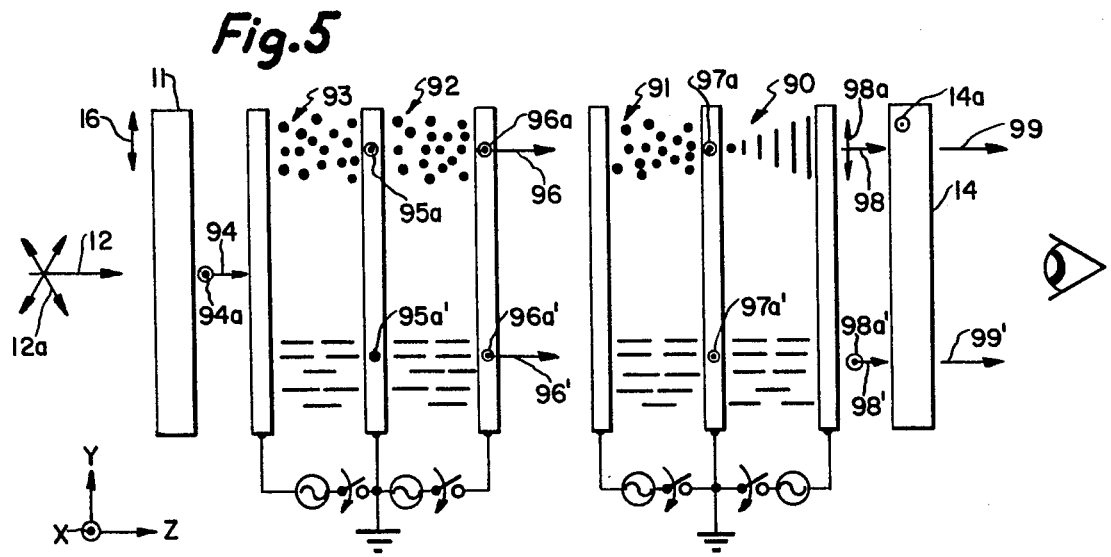

MULTI-COLORED LIQUID CRYSTAL DISPLAYS

BACKGROUND OF THE INVENTION

The present invention relates to liquid crystal displays and, more particularly, to novel transmissive liquid crystal displays actuable to provide each of a plurality of different visible colors to the light transmitted therethrough.

Known liquid crystal displays generally provide a dark display in one of the active or quiescent liquid crystal cell conditions and provide indicia having either a white or a selected color in the remaining condition. It is desirable to provide a display facilitating imparting each of a plurality of colors to the light transmitted through a liquid crystal display. Preferably, such cells should allow a maximum number of different colors to be obtained, with the maximum number of colors being geometrically related to the number of active liquid crystal cells in the display.

BRIEF SUMMARY OF THE INVENTION

Accordingly, it is one object of the present invention to provide novel transmissive liquid crystal displays capable of imparting each of a plurality of different colors to the visible light passing therethrough.

It is another object of the present invention to provide novel multi-colored liquid crystal displays capable of achieving $2^N$ different colors per display, where N is the number of active liquid crystal elements in a display.

In accordance with the invention, a multi-colored transmissive liquid crystal display utilizes at least one switchable liquid crystal element having a guest dichroic dye dissolved within the liquid crystal composition thereof. The cells are positioned between a pair of polarizing elements having their polarization axes arranged orthogonally to one another, with the polarizing element closest to the observer containing a dichroic dye normally having its elongated molecular axis aligned parallel to the axes of the dye molecules in the cells, when in a quiescent condition. The dichroic dye of each cell absorbs light of a different characteristic wavelength, when that cell is in a first, preferably quiescent, condition; light is allowed to pass through that cell substantially unabsorbed in the remaining, preferably activated, condition, whereby activation of selected ones of the sequentially arranged cells cause different portions of the visible spectrum to be absorbed and the remaining colored portions of the visible spectrum to be visible to an observer.

In one preferred embodiment, the dichroic dye-containing polarizing element is itself actuatable between quiescent and active conditions to provide white light as one of the visible light colors.

In another preferred embodiment, containing N liquid crystal cells between a pair of crossed static polarizing elements, a maximum of $2^N$ colors are obtainable by positioning a single twisted-nematic liquid crystal cell, or a pair of twisted-nematic liquid crystal cells, behind the dichroic dye-bearing (exit) polarizing element, with the remainder of the liquid crystal cells (between the twisted-nematic cells and a front polarizer receiving incident light) being of the parallel-nematic type.

The objects of the present invention will become apparent upon a consideration of the following detailed description and the accompanying figures.

BRIEF DESCRIPTION OF THE DRAWINGS

FIG. 3 is a schematic side view of a two cell liquid crystal display having a static exit polarizer;

FIG. 3a is a side view of an active exit polarizer utilizable as a replacement for the static exit polarizers shown in the remainder of the figures;

FIG. 4 is a schematic side view of a preferred embodiment of a three cell multi-color display with static exit polarizer, and FIG. 5 is a schematic side view of a preferred embodiment of a four cell multi-colored liquid cyrstal display.

DETAILED DESCRIPTION OF THE INVENTION

Figure 1:
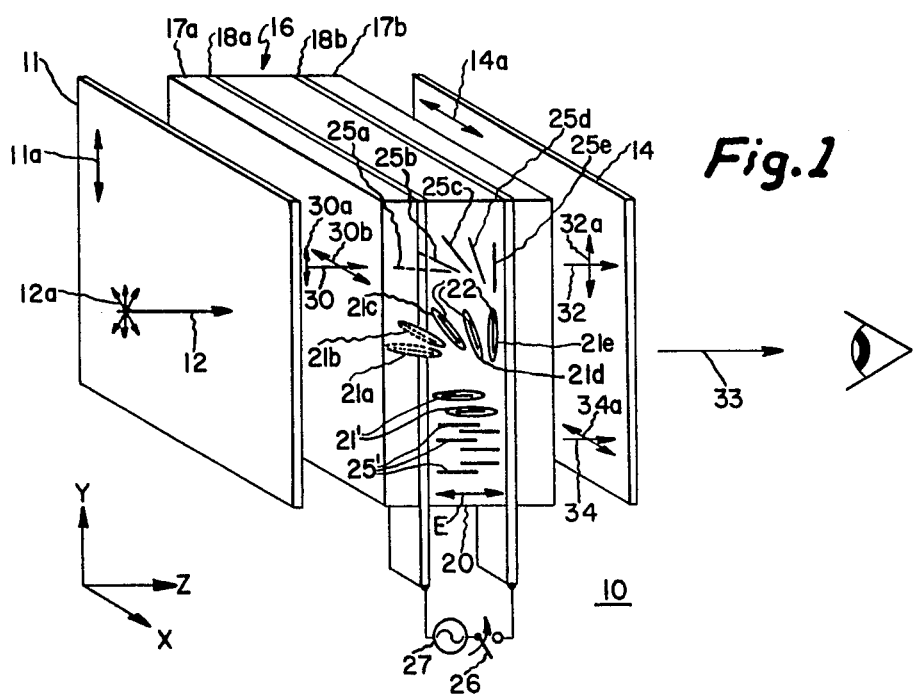
FIG. 1 is a perspective view of a first preferred embodiment of a multi-color transmissive liquid crystal display utilizing a single liquid crystal cell and in accordance with the principles of the invention.

Referring initially to FIG. 1 and FIGS. 1a–1c, transmissive liquid crystal display 10, capable of displaying symbols, characters and other indicia in a selected one of a plurality of colors, includes a first linear polarization element 11 having its polarization vector 11a fixedly aligned in the $\overline{Y}$ direction and receiving a beam 12 of incident white light of random polarization, as indicated by the random polarization vectors 12a. First, or entrance, polarization member 11 acts in substantially uniform manner on all wavelengths of the white light transmitted therethrough.

A second polarization member 14 is spaced from first polarization member 11 in a direction (along the $+\overline{Z}$ axis) toward an observer, with the planes of both polarization members 11 and 14 being substantially parallel. Polarization axis 14a is positioned essentially orthogonal to the polarization vector 11a of the first polarization member 11, i.e. second polarization member polarization vector 14 lies essentially in the $\overline{X}$ direction. Second polarization member 14 is a colored polarizer containing molecules of a dichroic dye, aligned with their elongated axes parallel to the direction ($\overline{X}$) of its polarization vector 14, to cause member 14 to absorb a selected range of visible light wavelengths.

A liquid crystal cell 16 is positioned between first and second polarization members 11 and 14. Cell 16 includes first and second parallel substrates 17a and 17b, respectively, formed of a substantially transparent material and preferably substantially in abutment with the adjacent polarization member 11 or 14, respectively. The interior facing surfaces of substrates 17a and 17b are coated with a substantially transparent conductive material to form a pair of substantially parallel electrodes 18a and 18b respectively. The volume between electrodes 18a and 18b is filled with a quantity 20 of a liquid crystal material host in which a suitable quantity of a guest dichroic dye material is dissolved. Preferably, the liquid crystal material is of the positive dielectric anisotropy type, whereby (with known treatment to the facing interior surfaces of the electrodes), the liquid crystal molecules 21 are caused to be positioned in the twisted-nematic mode in a quiescent cell, i.e. liquid crystal molecules 21a closest to front, or light-entrance, electrode 18a are aligned with their directors 22 parallel to the $\overline{X}$ direction; the directors 22 of molecules 21e closest to remaining, or light-exit, electrode 18b, are aligned at a 90° angle thereto, essentially in the $\overline{Y}$ direction; and the intermediate molecules 21b–21d, respectively, have their directors 22 aligned at progressively greater angles, up to the angle of the directors of molecules 21e, with the directors of $\overline{X}$-aligned molecules 21a. Thus, the quiescent cell has liquid crystal material whose molecules undergo a 90° twist from entrance electrode 18a to exit electrode 18b. It is known that elongated molecules 25 of a dichroic dye are positioned substantially parallel to the surrounding liquid crystal molecules, whereby those dye molecules 25a closest to entrance electrode 18a are aligned with their elongated direction substantially parallel to the direction of liquid crystal molecules 21a in the $\overline{X}$ direction, those molecules 25b–25e progressively further from electrode 18a are aligned with their elongated directions forming progressively greater angles to the elongated axis of dye molecules 25a, and the dye molecules 25e closest to remaining electrode 18b are substantially aligned in the $\overline{Y}$ direction parallel to the directors 22 of the adjacent liquid crystal molecules 21e.

The cell is placed in the active condition by closure of a switch 26 to connect an A.C. source 27 between electrodes 18a and 18b to cause an electric field E to be formed therebetween to "untwist" the liquid crystal molecules 21' to a position essentially parallel to the interior electric field vector E and substantially perpendicular to both electrodes. The dichroic dye molecules are similarly untwisted, by torques applied by the surrounding liquid crystal molecules and, in the active or field-applied condition, dye molecules 25' are also aligned substantially in the $\overline{Z}$ direction, perpendicular to both electrodes.

In operation, randomly polarized ambient white light beam 12 is transmitted through first linear polarization member 11 to emerge therefrom as a beam 30 of linearly polarized white light having a polarization vector 30a in the $\overline{Y}$ direction. The entrance polarization member operates in substantially uniform manner upon all visible wavelengths and all wavelength components of beam 30 are diminished essentially equally by passage through the entrance polarizer; assuming equal amplitudes for all incident wavelengths in beam 12, the various wavelengths ($\lambda$) of beam 30 are of substantially equal relative amplitudes Ar (FIG. 1a). The electrical field of the plane polarized beam 30 is orthogonal to both polarization vector 30a and the direction ($\overline{Z}$) of beam travel and hence the electrical field (E-field) vector 30b is parallel to the $\overline{X}$ direction vector. With cell 16 in the quiescent state (switch 26 open), the E-field vector 30b of the beam entering the cell is parallel to the elongated axes of the dichroic dye molecules 25a and light having wavelengths in the region of the absorption wavelength ($\lambda_1$) of the dye molecules is relatively greatly absorbed (FIG. 1b). As beam 30 is transmitted through the cell in the $\overline{Z}$ direction, the direction of the beam's polarization and E-field vectors are each rotated through an angle of 90° in the same direction as the twist of the liquid crystal and dye molecules within the cell. Thus, the electric vector 30b is continuously rotated until parallel to the elongated axes of the dichroic dye molecules adjacent exit electrode 18b; a beam 32 exiting from the cell, in the $\overline{Z}$ direction, has its electric vector 32a aligned substantially parallel to the $\overline{Y}$ direction. (Although not shown for purposes of simplicity, it should be understood that the polarization vector of exiting beam 32 is orthogonal to the direction of beam travel and to the electric field vector 32a, and hence is substantially parallel to the $\overline{Y}$ direction vector).

Beam 32, now relatively deficient in photons having wavelengths at (or near) the absorption wavelength $\lambda_1$, of the dye in the cell, encounters the dichroic dye molecules of second polarization member 14, which dye molecules are aligned parallel to polarization vector 14a. The electric field vector 32a is orthogonal to the elongated direction of the dye molecules and a minimal amount of light is absorbed at the absorption wavelength $\lambda_2$ ($\lambda_2 \neq \lambda_1$) of the dye molecules in member 14, whereby the beam 33 of light exiting in the $\overline{Z}$ direction away from display 10 is deficient in photons only of wavelength $\lambda_1$ and may be observed to have a color which is the complement of wavelength $\lambda_1$ absorbed by the dichroic dye molecules within liquid crystal cell 16 (FIG. 1c, solid curve).

In the active condition (switch 26 closed), the electric field vector 30b of the linearly-polarized light beam enters cell 16 and encounters dye molecules 25' in an "end on" condition, whereby the electric field vector is substantially perpendicular to the elongated direction of the dye molecules and no preferential wavelength absorption occurs in the dye (FIG. 1b, broken curve). Rotation of the polarization and electric field vectors does not occur and an exiting light beam 34 has its electric field vector 34a still positioned substantially parallel to the $\overline{X}$ direction vector. Electric field vector 34a is now parallel to polarization vector 14a and the dichroic dye molecules parallel thereto, whereby the dye molecules of second polarization member 14 absorb in a preferential manner a substantial portion of the light having their characteristic absorption wavelengths $\lambda_2$. Thus, after passage through second polarization member 14 (FIG. 1c, broken curve) the amplitude of the observable light beam 33 is substantially unchanged (relatively little absorption) at the wavelength $\lambda_1$ of the dichroic dye within cell 16, but has been relatively greatly attenuated by a substantial absorption of light at the wavelength $\lambda_2$ of the dichroic dye utilized in polarization member 14.

A display having a selectable one of a pair of colors is obtained with the first color being deficient in light of wavelengths in the region about 80 $_1$ and the other color being deficient in light of wavelengths in the region about $\lambda_2$ ($\lambda_2 \neq \lambda_1$). For example, a cell 16 is fabricated with 1% indophenyl blue dichroic dye dissolved in a positive dielectric anisotropy liquid crystal material and utilized to construct a twisted-nematic cell in known manner while second polarization member 14 is formed of a sheet of Polaroid Variable Red polarizing material; in the quiescent (twisted-nematic) condition, a substantial portion of "yellow" light in the region of wavelength $\lambda_1$ of approximately 600 nanometers is absorbed, whereby the display appears to have a blue color. In the active (untwisted) condition, no absorption takes place at the "yellow" wavelengths, but absorption in the "green" portion of the visible spectrum at wavelengths about $\lambda_2$ of approximately 520 nanometers was accomplished by the dichroic dye in polarization member 14, whereby a red display is observed.

Figures 1A, 1B, 1C:
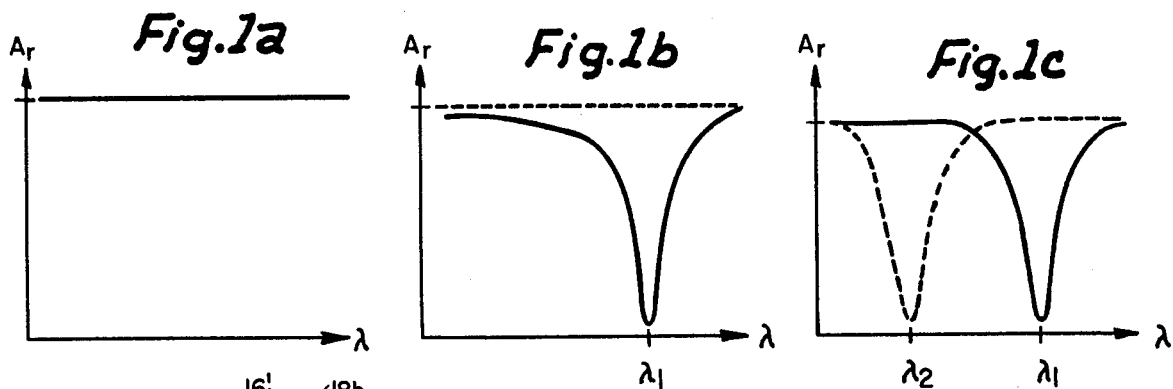
FIGS. 1a–1c are a set of coordinated graphs illustrating the relative light transmission at various locations within the display and useful in understanding the principles of the present invention.
Figure 2:
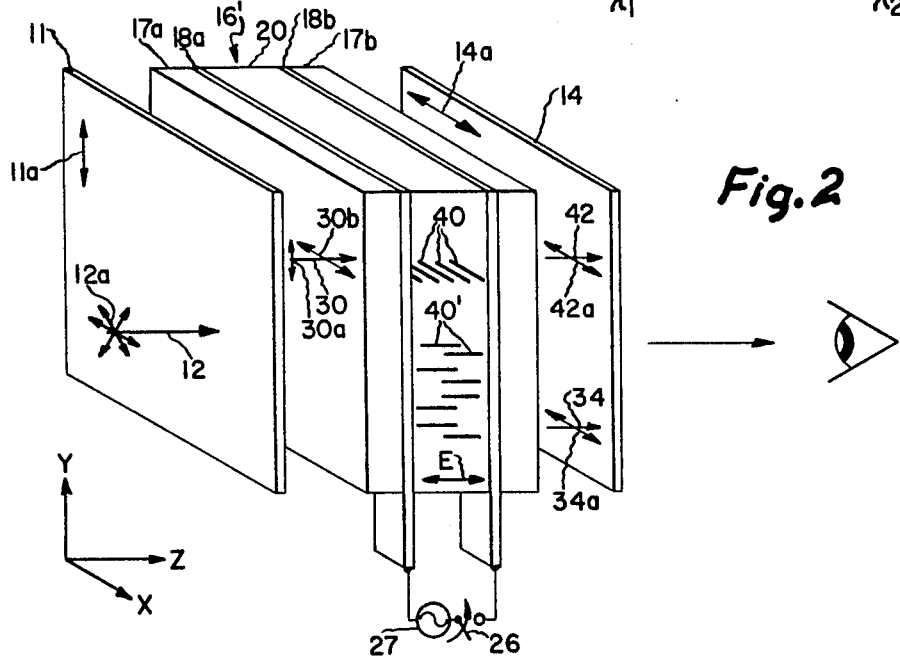
FIG. 2 is a perspective view of a second preferred embodiment of a single cell multi-colored liquid crystal display.

Referring now to FIG. 2, wherein like reference designations are utilized for like elements, a parallel-nematic liquid crystal cell 16' replaces the twisted-nematic cell of FIG. 1. Similar construction is utilized, but the interior facing surfaces of electrodes 18a and 18b are treated in such manner as to cause, in the quiescent condition, all of dichroic dye molecules 40 to be aligned with their elongated axes substantially parallel to the direction of the polarization vector 14a of the exit polarization member, i.e. parallel to the $\overline{Y}$ direction vector. In the active (field-applied condition) the dichroic dye molecules 40' assume the homeotropic alignment and are substantially "end-on" and perpendicular to the planes of the electrodes. It should be understood that the host liquid crystal molecules (not shown for reasons of simplicity) are substantially untwisted and parallel to the dye molecules in each condition.

It will be seen that, in the active state, the E-field vector 30b is perpendicular to the elongated dimension of dye molecules 40', whereby light is not preferentially absorbed within cell 16' and is only preferentially absorbed, at wavelength $\lambda_2$, in the dye molecules of second polarization member 14 where the molecules are parallel to electric vector 34a. Thus, with the cell in the active condition, and using the above-mentioned green-absorbing polarization member 14, a red display is observable. In the quiescent condition, entering electric vector 30b is parallel to the elongated axes of the quiescent dye molecules 40, whereby light is preferentially absorbed within the dye molecules as absorption wavelength $\lambda_1$, but without causing a spatial rotation of the electric vector about the $\overline{Z}$ axis as beam 30 is transmitted through cell 16'. Thus, the beam 42 of light emerging in the $\overline{Z}$ direction from cell 16' has its electric field vector 42a still in the $\overline{X}$ direction and has been preferentially absorbed at the wavelength $\lambda_1$ associated with dye molecules 40. As electric field vector 42a is parallel to the elongated axes of the dye molecules of the second polarization member 14, light of the characteristic absorption wavelengths $\lambda_2$ of these dye molecules is also absorbed, whereby the observable light in the quiescent-cell condition is deficient at both wavelengths $\lambda_1$ and $\lambda_2$, and appears, for the sample cell having a yellow-absorbing dichroic dye and used with a green-absorbing plane polarizer, to be a purple color.

It should be understood that both the parallel-nematic cell and the twisted nematic cell may be utilized with liquid crystal materials of negative dielectric anisotropy, whereby the homeotropic or "end-on" condition is achieved in the quiescent condition and the active condition finds the elongated dye molecule aligned parallel to the electrode surfaces.

Referring now to FIG. 3, the single twisted nematic cell 16 of the embodiment of FIG. 1 is replaced by a pair of twisted-nematic cells (N, the number of active liquid crystal cells, is thus equal to 2) with the cells sequentially arranged between orthogonally-oriented polarization members 11 and 14. While two separate cells may be so arranged, the additional light attenuation of a pair of less-than-perfectly-transmissive electrodes and substrates in each of the plurality of sequentially arranged cells is less than desirable, whereby a double-cell 50 having only a pair of entrance and exit substrates 51a and 51b, respectively, each supporting a substantially transparent, conductive electrode 52a and 52b respectively, is used with a common electrode 52c, (supported about its periphery by means not shown for purposes of simplicity) to reduce the number of light absorptive elements required. The volume defined between entrance electrode 52a and common electrode 52c forms a first liquid crystal cell-space 50a while the remaining volume between common electrode 52c and exit electrode 52b forms a second cell-space 50b. The cells fabricated in each of cell-space volumes 50a and 50b are of the twisted nematic type, whereby with the preferred positive dielectric anisotropy liquid crystal material, both cells are in the twisted nematic condition, as shown by the elongated dye molecules undergoing a 90° twist in the quiescent condition (upper portion of each cell space) and are in the homeotropic condition in the active state, responsive to the independent formation of electric fields $E_1$ and $E_2$, respectively, responsive to closure of respective switches 54 and 55, respectively, and independently coupling signal source 56 between electrodes 52a and 52c and signal source 57 between common electrode 52c and exit electrode 52b. Thus, common electrode 52c is a virtual ground with respect to the voltages at each of independently-energizable electrodes 52a and 52b, and may in fact be coupled to a ground potential common to the signal source electronics.

The dichroic dyes utilized in cell-space 50a ($\lambda_1$), cell-space 50b ($\lambda_2$) and exit polarizer 14 ($\lambda_3$) are selected for mutually exclusive absorption wavelengths ($\lambda_1 \neq \lambda_2 \neq \lambda_3$) in the visible spectrum, e.g. a first dichroic dye, filling cell-space 50a, absorbs at $\lambda_1$ in the yellow portion of the visible spectrum; a second dichoric dye filling cell-space 50b absorbs at $\lambda_2$ in the green portion of the visible spectrum; and the dichroic dye molecules parallel to the $\overline{X}$ direction vector in exit polarizer 14 absorb at $\lambda_3$ in the blue portion of the visible spectrum.

In operation, all beams 30 of light exiting from entrance polarizer 11, having its polarization vector 11a aligned in the $\overline{Y}$ direction, have their electric field vectors 30b aligned in the $\overline{X}$ direction (into and out of the plane of the drawing). Considering first the condition wherein both cells are in the quiescent (twisted) condition, entering electric field vector 30b is parallel to the elongated dichroic dye molecules 56a closest to entrance electrode 52a and hence light is preferentially absorbed at wavelengths at and near $\lambda_1$ by the dichroic dye molecules. The plane of polarization is rotated 90° by the transition of cell-space 50a, whereby a beam 58 of light leaves first cell-space 50a with its yellow wavelengths substantially attenuated and its electric field vector 58a aligned substantially in the $\overline{Y}$ direction. As electric field vector 58a is orthogonal to the elongated direction of the dichroic dye molecules 60a closest to common electrode 52c, substantially no absorption at the green wavelengths (characteristic of the dyes in cell-space 50b) occurs even as the polarization of electric vector 58a is again rotated 90° by transmission through the second cell-space. A beam 62 emerging from the double cell has its electric field vector 62a again aligned in the $\overline{X}$ direction, whereby substantial absorption occurs in the wavelength region $\lambda_3$ characteristic of the now-parallel-aligned dye molecules of the exit polarizer member 14. Thus, the light observable looking into the display, in the $-\overline{Z}$ direction, is relatively deficient in amplitude at both the yellow and blue wavelengths and the display appears to be of a green color.

Similarly, with both cells in the active condition, whereby the elongated dye molecules are aligned substantially in the $\overline{Z}$ direction (bottom half of the double cell in FIG. 3) the $\overline{X}$ directed electric field vector 30b is orthogonal to the elongated axes of all dye molecules in cell-spaces 50a and 50b, whereby substantially no preferential attenuation occurs at the absorption wavelengths $\lambda_1$ and $\lambda_2$ of the dyes in either of cell-spaces 50a and 50b. As the cells are no longer in the twisted configuration, rotation of the E-field vector 30b does not occur during transmission through the liquid crystal composition in either cell-space, whereby the beam 64 of light emerging from cell space 50a has its E-field vector 64a aligned in the $\overline{X}$ direction and the beam 66, emerging from the double cell 50, also has its electric field vector 66a parallel to both the $\overline{X}$ direction vector and the elongated axes of the dye molecules in exit polarization member 14. Upon transmission through polarization member 14, light in the blue portion of the visible spectrum is absorbed, whereby the light transmitted through the display is deficient only at the blue wavelengths and is observable to have a yellow color, when both cells are active.

Two additional modes of operation, with only cell 1 in the active condition or with only cell 2 in the active condition, are possible. These additional modes of operation, as well as the two modes hereinabove described, and, indeed, the multiplicity of mode combinations achievable for any display having a plurality of sequential, independently activatable cells, can be found by synthesizing a state diagram in which the combinations are arrayed in orderly fashion. In the state diagram, I utilize the symbol ·| to indicate a twisted-nematic cell in its twisted configuration; the symbol · to indicate a parallel-nematic cell in its homogenous, or molecules-parallel-to-cell-wall, configuration; and the symbol — to indicate either cell having its dye molecules aligned with their elongated axes parallel to the direction of light transmission through the cell. The static exit polarizing member 14, having its dye molecules positioned permanently with fixed alignment, in the plane into and out of the drawing, has a fixed state · symbol. Linearly polarized light, entering the sequentially-arranged cells has its E-field vector parallel to the polarization vector of exit polarizer 14 and is symbolized as ⊙→.

As seen in Table I, wherein the electric field vector of the beam is shown entering a cell from the left, the four possible modes of the two active-liquid-crystal-cell multi-colored display yield transmitted light respectively having absorbed light at: (a) the wavelength ranges of the first cell and the exit polarizer; (b) the first cell only; (c) the second cell only; and (d) the polarizer only for a total of four (=$2^N$, where N is equal to 2, the number of active dichroic dye-bearing cells) different colors.

TABLE I

| N=2 | Cell 1 | Cell 2 | Polarizer | Colors Absorbed by |
|---|---|---|---|---|
| ⊙→ | ·| | ·| | · | Cell 1 and Polarizer |
| ⊙→ | ·| | — | · | Cell 1 |
| ⊙→ | — | ·| | · | Cell 2 |
| ⊙→ | — | — | · | Polarizer |

Referring now to FIG. 3a, the static exit polarizer 14 may be replaced by an active liquid crystal polarizing cell 14' having substrates 70a and 70b upon the interior facing surfaces of which are fabricated a pair of spaced electrodes 71a and 71b; a quantity 72 of liquid crystal material is placed between the electrodes and operated in the parallel-nematic configuration with elongated dichroic dye molecules 73 supported between liquid crystal molecules 72a. In the quiescent condition, with a positive dielectric anisotropy liquid crystal material, the liquid crystal molecules and their guest dichroic dye molecules are aligned parallel to the planes of the electrodes, with the active plane polarizer having a polarization axis into and out of the plane of the drawing. In the active condition, when a switch means 75 is closed to couple a source 76 between the electrodes, an electric field E' is established to position the liquid crystal molecules 72a' and the dichroic dye molecules 73' perpendicular to the planes of the electrodes, i.e., in the "end-on" low absorption condition.

Combining the embodiments of FIGS. 3 and 3a, i.e. a three-active cell device having a pair of twisted nematic cells 50 and an actuatable plane polarizer 14', the operation is analyzed by the state diagram of Table II. It is to be noted that the first four entries, with the actuatable exit polarizer in the quiescent condition, is exactly the same as the state diagram of Table I for the two-cell display with static exit polarizer. The actuatable polarizer in its active condition provides a single additional "color," that of white light in the no-absorption condition when all three of the actuatable cells are active and the dye molecules in each are aligned with their elongated axes parallel to the direction of light propagation through the display.

TABLE II

| N=3 | Cell 1 | Cell 2 | Polarizer | Colors Absorbed by |
|---|---|---|---|---|
| ⊙→ | ·| | ·| | · | Cell 1 and Polarizer |
| ⊙→ | ·| | — | · | Cell 1 |
| ⊙→ | — | ·| | · | Cell 2 |
| ⊙→ | — | — | · | Polarizer |
| ⊙→ | ·| | ·| | — | Cell 1 |
| ⊙→ | ·| | — | — | Cell 1 |
| ⊙→ | — | ·| | — | Cell 2 |
| ⊙→ | — | — | — | No Absorption (White Light) |

It is to be noted at this point that this combination of three active devices, as illustrated in the state diagram of Table II, does not yield the maximum number of possible color absorption combinations, having several redundant states.

Referring now to FIG. 4, a three-active-device display having the maximum number of attainable color absorption combinations utilizes a pair of twisted-nematic cells 78 and 79 sequentially aligned in the $-\overline{Z}$ direction behind exit polarizer 14, and a parallel-nematic cell 80 between entrance polarizer 11 and first twisted-nematic cell 79. Each cell is switchable between its quiescent and active condition by operation of switch means 81a, 81b and/or 81c, respectively, coupling one of sources 82a, 82b or 82c to the respective set of cell electrodes. It is expected that the maximum number of color absorption combinations will be $2^N$, where N=3, for this device and, as shown in the state diagram of Table III, this is the result actually achieved.

TABLE III

| N=3 | Cell 1 | Cell 2 | Cell 3 | Polarizer | Colors Absorbed by |
|---|---|---|---|---|---|
| ⊙→ | · | ·| | ·| | · | Cells 1 and 2 and Polarizer |
| ⊙→ | · | ·| | — | · | Cells 1 and 2 |
| ⊙→ | · | — | ·| | · | Cells 1 and 3 |
| ⊙→ | · | — | — | · | Cell 1 and Polarizer |
| ⊙→ | — | ·| | ·| | · | Cell 2 and Polarizer |
| ⊙→ | — | ·| | — | · | Cell 2 |
| ⊙→ | — | — | ·| | · | Cell 3 |
| ⊙→ | — | — | — | · | Polarizer |

The following analysis of the first and last state conditions of the table are done by way of illustration: In the all quiescent condition, the $\overline{X}$-polarized beam 81 (FIG. 4) entering cell 80 is absorbed preferentially at the absorption wavelength $\lambda_1$ of the dye therein to emerge as a beam 82 having electric field polarization in the $\overline{X}$ direction parallel to the initially-encountered molecules of the twisted nematic cell 79, whereby preferential absorption at the absorption wavelength $\lambda_2$ of the dye in the second cell also occur. The first twisted-nematic cell 79 imparts a 90° rotation and exiting beam 83 has its electric field vector 83a aligned in the $\overline{Y}$ direction, whereby preferential wavelength absorption does not occur in third cell 78. Cell 78, however, imparts a second 90° rotation to the light beam, whereby light beam 84 exiting from the third cell has its electric field vector 84a again in the $\overline{X}$ direction parallel to the dye molecules in exit plane polarizer 14, causing preferential absorption to occur at the absorption wavelength $\lambda_3$ of the exit polarizer.

In the all-cells-active configuration, shown at the bottom of FIG. 4, the entering beam 81' passes sequentially through each of cells 80, 79 and 78, respectively, without preferential absorption therein as the electric-field vector 81a is in the $\overline{X}$ direction and is orthogonal to the elongated dye molecule axes (in the $\overline{Z}$ direction) in each of the three cells. Light emerges from cell 78 as a beam 84' still having an E-field vector 81a' in the $\overline{X}$ direction, facilitating preferential absorption of viewable beam 86 only in exit polarizer 14.

Referring now to FIG. 5, a final example is illustrated with N=4 active cells. The first cell immediately behind exit polarizer 14 is a twisted-nematic cell 90 and the remaining three cells 91, 92 and 93, respectively, sequentially aligned between twisted-nematic cell 90 and entrance polarizer 11, are independently actuatable cells of the parallel-nematic type. Referring to the state diagram in Table IV, it can be seen that the illustrated configuration yields $2^N$ (e.g. $2^4=16$) possible color absorption combinations, without repetitions.

TABLE IV

| N=4 | Cell 1 | Cell 2 | Cell 3 | Cell 4 | Polarizer | Colors Absorbed By |
|---|---|---|---|---|---|---|
| ⊙→ | · | · | · | ·\| | · | Cells 1, 2, 3, 4 |
| ⊙→ | · | · | · | — | · | Cells 1, 2, 3 & Polarizer |
| ⊙→ | · | · | — | ·\| | · | Cells 1, 2, 4 |
| ⊙→ | · | · | — | — | · | Cells 1, 2 & Polarizer |
| ⊙→ | · | — | · | ·\| | · | Cells 1, 3, 4 |
| ⊙→ | · | — | · | — | · | Cells 1, 3 & Polarizer |
| ⊙→ | · | — | — | ·\| | · | Cells 1, 4 |
| ⊙→ | · | — | — | — | · | Cells 1 & Polarizer |
| ⊙→ | — | · | · | ·\| | · | Cells 2, 3, 4 |
| ⊙→ | — | · | · | — | · | Cells 2, 3 & Polarizer |
| ⊙→ | — | · | — | ·\| | · | Cells 2, 4 |
| ⊙→ | — | · | — | — | · | Cell 2 & Polarizer |
| ⊙→ | — | — | · | ·\| | · | Cells 3 & 4 |
| ⊙→ | — | — | · | — | · | Cell 3 & Polarizer |
| ⊙→ | — | — | — | ·\| | · | Cell 4 |
| ⊙→ | — | — | — | — | · | Polarizer |

The first (all-quiescent) and the last (all-active) states of the four-actuatable-cell device are analyzed as follows: in the all-quiescent state, plane polarized beam 94 has its E-field vector 94a in the $\overline{X}$ direction, parallel to the elongated axes of the dye molecules in parallel-nematic cells 93, 92 and 91. Transmission of beam 94 through the first quiescent cell 93 causes preferential absorption at the absorption wavelength $\lambda_1$. The beam emerging from cell 93 remains polarized with its E-field vector 95a in the $\overline{X}$ direction and is further preferentially absorbed at the absorption wavelength $\lambda_2$ of the dye in the next sequential parallel-nematic cell 92. The beam 96 emerging from cell 92, towards cell 91, is thus deficient in light at wavelengths $\lambda_2$ and $\lambda_1$, and is still polarized with E-field vector 96a in the $\overline{X}$ direction, for preferential absorption at the absorption wavelength of $\lambda_3$ of the dye within the third sequential parallel-nematic cell 91. Light leaving cell 91 has its E-field vector 97a also in the $\overline{X}$ direction and parallel to the first-encountered dye molecules within the twisted-nematic cell 90. Thus, during transmission through cell 90, light is preferentially absorbed at the absorption wavelength $\lambda_4$ of the twisted-nematic cell and is also rotated 90° in direction, whereby a beam 98 of light exiting from the last actuatable cell 90 has its E-field vector 98a now parallel to the $\overline{Y}$ direction vector. The E-field direction of beam 98 is orthogonal to the polarization vector 14a of the exit polarizer and light is not absorbed by the dichroic dye molecules in the polarizer. Thus, beam 99 exiting from the display has relatively low amplitudes of light at each of the absorption wavelengths $\lambda_1$–$\lambda_4$ of the liquid crystal cells, but has a relatively large amount of visible light at all other wavelengths, including the wavelength of the exit polarizer dye molecules.

In the all-active state (illustrated at the bottom of FIG. 5 and the last line of Table IV) each of cells 90–93 has been activated to position its dichroic dye molecules parallel to the $\overline{Z}$ direction, i.e. orthogonal to the E-field vector 94a of the plane polarized light beam 94 entering the sequential arranged cells. Absorption and rotation does not occur in any of the four cells, whereby the light beam 98' exiting from cell 90 toward plane polarizer 14 has both the same relative amplitude-wavelength relationship and the same orientation of its E-field vector 98a', as the entering light beam 94. As E-field vector 98a' is parallel to the dichroic dye molecules of exit polarizer 14, preferential absorption at the absorption wavelength $\lambda_5$ thereof occurs and the beam 99' of light exiting from the display is now relatively deficient only at wavelength $\lambda_5$.

I have found (and one skilled in the art may verify by use of state diagrams) that any number of actuatable liquid crystal-dichroic dye cells, each cell containing a dichroic dye absorbing at a wavelength different from the absorption wavelength of all others of the cells, yields a display capable of providing a plurality of viewable colors, whether the cells are all of the parallel-nematic type, all of the twisted-nematic type or a combination of the two types. I have also found that achievement of the maximum number $2^N$ of absorption (and color) combinations will occur only if one or both of the cells immediately behind the exit plane polarizer are of the twisted-nematic type with the remainder of the cells between the twisted-nematic cells and the entrance polarizer being of the parallel-nematic type. In practice, the polarity of dielectric anistropy of the liquid crystal material utilized in the cells is of importance only in establishing whether presence or absence of A.C. drive to each set of cell electrodes is required to achieve the cell conditions of each state sequence on the state diagram; substitution of negative dielectric anisotropy material for the cells illustrated with positive dielectric anisotropy material, under the same drive conditions, will only cause rearrangement of the state diagram without changing the number or sequence of wavelengths absorbed - cell type and relative position being otherwise identical.

While the present invention has been described with reference to several preferred embodiments thereof, many variations and modifications will now become apparent to those skilled in the art. It is my intention, therefore, to be limited not by the scope of the specific disclosure herein, but only by the scope of the appending claims.

What is claimed is:

1. A transmissive display for selectively imparting one of a plurality of colors to visible light transmitted in a first direction therethrough, comprising:
   a first polarization member having an axis of polarization positioned in a second direction substantially perpendicular to said first direction;
   a second polarization member having an axis of polarization positioned in a third direction substantially perpendicular to both said first and second directions, said second polarization member absorbing light in a region about a first wavelength in the visible spectrum when the light is polarized with its electric field vecto parallel to the axis of polarization of said second polarization member;
   a liquid crystal cell positioned between said first and second polarization members and along the optical path in said first direction therebetween, said cell being actuable between first and second conditions of molecular orientation; and
   means contained within said cell for absorbing visible light in a region about a second wavelength different from said first wavelength, only when said cell is actuated to said first condition of molecular orientation; said means allowing transmission of light through said cell substantially without absorption when said cell is actuated to said second condition.

2. A display as set forth in claim 1, wherein said means is a dichroic dye dissolved in the liquid crystal material of the cell.

3. A display as set forth in claim 2, wherein said cell contains liquid crystal material having positive dielectric anisotropy.

4. A display as set forth in claim 2 wherein said cell is of the parallel-nematic type having the elongated axes of the molecules of the dichroic dye positioned substantially parallel to respectively the third and first directions respectively in said first and second orientation conditions.

5. A display as set forth in claim 2, wherein said cell is of the twisted-nematic type having the elongated axes of the molecules of the dichroic dye positioned substantially parallel to the first direction of travel of light through said cell in said second condition and twisted substantially through an angle of 90° with the dye molecules initially encountered by light entering said cell being positioned substantially parallel to said third direction in said first condition.

6. A display as set forth in claim 1, wherein said second polarization member is independently actuatable between first and second conditions, said first condition characterized by absorption of transmitted light in said region about said first wavelength, said second condition characterized by transmission of light through said second polarization member substantially without absorption of light therein.

7. A display as set forth in claim 6, wherein said second polarization member is another liquid crystal cell containing a dichroic dye absorbing light in said region about said first wavelength.

8. A display as set forth in claim 7, wherein said another liquid crystal cell is of the parallel-nematic type having the axes of the dye molecules therein positioned substantially parallel to respectively the third and first directions respectively in said first and second conditions.

9. A display as set forth in claim 1, further comprising an additional (N-1) independently actuatable liquid crystal cells, where N is an integer greater than 1, sequentially arranged between said first polarization member and said liquid crystal cell and along a path of light transmission therebetween, each additional cell configured to operate in one of a parallel-nematic and a twisted-nematic mode of operation and independently actuatable between first and second conditions of molecular orientation; each additional cell containing means for absorbing visible light in a region about another wavelength different from said first and second wavelengths and from each other and absorbing only when the associated additional cell is actuated to said first condition; each said means allowing transmission of light through the associated additional cell substantially without absorption when the associated additional cell is actuated to said second condition.

10. A display as set forth in claim 9, wherein said means is a dichroic dye dissolved in the liquid crystal material of the associated additional cell.

11. A display as set forth in claim 10, wherein said second polarization member is independently actuatable between first and second conditions, said first condition characterized by absorption of transmitted light in said region about said first wavelength, said second condition characterized by transmission of light through said second polarization member substantially without absorption of light therein.

12. A display as set forth in claim 11, wherein said second polarization member is another liquid crystal cell containing a dichroic dye absorbing light in said region about said first wavelength.

13. A display as set forth in claim 12, wherein said another liquid crystal cell is of the parallel-nematic type having the axes of the dye molecules therein positioned substantially parallel to respectively the third and first directions respectively in said first and second conditions.

14. A display as set forth in claim 13 wherein each additional cell contains liquid crystal material having positive dielectric anisotropy.

15. A display as set forth in claim 9, wherein said (N−1) additional cells comprise a first independently actuatable cell of the twisted-nematic type and positioned closest to said liquid crystal cell, said first cell preferentially absorbing light entering said first cell with an electric-field vector only substantially aligned in the third direction; any remaining additional cells being of the parallel-nematic type and only perferentially absorbing entering light having electric-field vector thereof substantially aligned in the third direction, to facilitate absorption of a maximum number $2^N$ of wavelength combinations from light transmitted through said display.

16. A display as set forth in claim 9, wherein said (N−1) additional cells are all of the parallel-nematic type and each only preferentially absorbing entering light having the electric-field vector thereof substantially aligned in the third direction, to facilitate absorption of a maximum number $2^N$ of wavelength combinations from light transmitted through said display.

* * * * *